(12) United States Patent
Gutknecht et al.

(10) Patent No.: US 7,083,815 B2
(45) Date of Patent: Aug. 1, 2006

(54) PROCESS FOR MAKING YOGURT CREAM CHEESE, AND THE RESULTING PRODUCTS

(75) Inventors: Jon R. Gutknecht, Downingtown, PA (US); John B. Ovitt, Franklin, VT (US)

(73) Assignee: Franklin Foods, Inc., Enosburg Falls, VT (US)

( * ) Notice: Subject to any disclaimer, the term of this patent is extended or adjusted under 35 U.S.C. 154(b) by 123 days.

(21) Appl. No.: 10/369,163

(22) Filed: Feb. 19, 2003

(65) Prior Publication Data

US 2004/0161492 A1   Aug. 19, 2004

(51) Int. Cl.
  *A23C 9/12*   (2006.01)
(52) U.S. Cl. .......................... 426/36; 426/39; 426/43; 426/582; 426/583
(58) Field of Classification Search ................ 426/36, 426/39, 43, 582, 583, 34, 42, 580
See application file for complete search history.

(56) References Cited

U.S. PATENT DOCUMENTS

| | | | |
|---|---|---|---|
| 3,749,583 A * | 7/1973 | Cox et al. ............... | 426/37 |
| 3,929,892 A | 12/1975 | Hynes et al. | |
| 4,110,476 A | 8/1978 | Rhodes | |
| 4,293,573 A | 10/1981 | Bradley, Jr. et al. | |
| 4,410,549 A | 10/1983 | Baker | |
| 4,434,184 A | 2/1984 | Kharrazi | |
| 4,724,152 A | 2/1988 | Baker et al. | |
| 4,749,584 A | 6/1988 | Wirchansky et al. | |
| 4,837,035 A | 6/1989 | Baker et al. | |
| 4,837,036 A | 6/1989 | Baker et al. | |
| 4,956,186 A | 9/1990 | Streiff et al. | |
| 4,968,512 A | 11/1990 | Kharrazi | |
| 5,079,024 A | 1/1992 | Crane | |
| 5,180,604 A | 1/1993 | Crane et al. | |
| 5,252,352 A | 10/1993 | Banach et al. | |
| 5,356,639 A | 10/1994 | Jameson et al. | |
| 5,378,478 A | 1/1995 | Miller et al. | |
| 5,395,631 A | 3/1995 | Sweeney | |
| 5,449,523 A | 9/1995 | Hansen et al. | |
| 5,520,948 A | 5/1996 | Kvamme | |
| 5,676,984 A | 10/1997 | Bohanan et al. | |
| 5,679,396 A | 10/1997 | Finnocchiaro | |
| 5,820,903 A | 10/1998 | Fleury et al. | |
| 5,882,704 A | 3/1999 | Yamaguchi et al. | |
| 6,025,008 A | 2/2000 | Akahoshi et al. | |
| 6,096,352 A | 8/2000 | Kijowski et al. | |
| 6,136,351 A | 10/2000 | Nauth et al. | |
| 6,183,802 B1 | 2/2001 | Silva et al. | |
| 6,406,736 B1 | 6/2002 | Han | |
| 6,416,797 B1 | 7/2002 | Han et al. | |
| 6,419,974 B1 | 7/2002 | Silva et al. | |
| 6,544,567 B1 | 4/2003 | Davis et al. | |
| 2002/0068112 A1 | 6/2002 | Murphy et al. | |

OTHER PUBLICATIONS

Tamime et al, Yoghurt Science and Technology, 1985, Pergamon Press, Oxford, p. 250, Fig. 5. 12..*
Newlander, C.E., "The Babcock Test: Notes on Its Use in Determining TM Percentage of Fat in Whole Milk, Skim-Milk, Buttermilk, Cream and Whey," Bulletin No. 2, Extension Series, Mar. 1916, pp. 1-11, Publisher: Michigan Agricultural College, Extension Division.
U.S. Food & Drug Administration, Grade "A" Pasteurized Milk Ordinance, 2001 Revision.
Waukesha Cherry-Burrell, Votator Scraped Surface Heat Exchangers, 2001.

* cited by examiner

*Primary Examiner*—Leslie Wong
(74) *Attorney, Agent, or Firm*—The Eclipse Group LLP; Jay M. Brown

(57) ABSTRACT

A process for making a yogurt cream cheese product comprising steps of: providing a milkfat fluid having an initial butterfat content level; pasteurizing the milkfat fluid to yield a cream cheese precursor; providing a yogurt, and combining the yogurt with the cream cheese precursor to yield a combined precursor; and homogenizing and acidifying the combined precursor; yielding a yogurt cream cheese product. A yogurt cream cheese product comprising between about 8% by weight and about 35% by weight of total butterfat; the yogurt cream cheese product comprising between about 10% by weight and about 40% by weight of yogurt, having a viscosity between about 1,000,000 centipoises and about 3,000,000 centipoises at a temperature of about 74° F.; and yielding less than about 1% syneresis by weight after 15 hours at about 74° F. to about 75° F.

38 Claims, 2 Drawing Sheets

PROCESS FOR MAKING YOGURT CREAM CHEESE, AND THE RESULTING PRODUCTS

FIELD OF THE INVENTION

The present invention relates to the field of processes for making cream cheeses, and the resulting products. More particularly, the present invention relates to processes for making yogurt cream cheese products that comprise yogurt and retain whey from the milkfat fluid used to make the products. These yogurt cream cheese products combine the desirable texture and mouth feel of cream cheese, having a dramatically improved flavor due to retained whey, with the additionally desirable taste and active culture bacteria health benefits of yogurt.

BACKGROUND OF THE INVENTION

Cream cheese products are ubiquitous in modern diets. They generally have a smooth texture and a bland, unremarkable flavor. Spreadability makes cream cheese convenient to use, which is the primary basis for its choice by consumers over other firmer cheeses and the reason for its high volume consumption as a topping, for example on breads including bagels. In the classic method for making cream cheese, a pasteurized milkfat fluid such as cream, having a butterfat content generally between about 34.5% by weight and 50% by weight, is the primary raw material. This milkfat fluid is subjected to thorough digestion by lactic acid—producing bacteria, homogenized, and clotted by enzymes or acidification. The milkfat fluid is thus transformed into a solid phase referred to as the curd, and a liquid phase referred to as the whey. Most of the butterfat content of the milkfat fluid is retained in the curd; and significant protein content, having nutritional value and much of the desirable potential flavor, remains in the whey. At such a point, the curd is further processed into the desired cream cheese product, and the whey is discarded, along with its flavor. As a result, cream cheese typically has a bland, dull, virtually unnoticeable taste. The retention of liquid whey in the curd is a problem in itself, as the liquid gradually leaks out of the curd in an unappealing and ongoing separation that is called syneresis. In addition, large scale cream cheese production generates corresponding quantities of often unusable whey, which thus becomes a waste expense and environmental detraction unless some other use can be found for it.

The minimum butterfat content for cream cheese is 33% by weight. It is a pervasive goal in the human diet to consume less fat; and the relatively high butterfat content of a typical cream cheese is not helpful in achieving this goal. Countless attempts have been made to make low-fat cream cheese products, but the resulting cheese products have failed due to unacceptable taste and poor texture.

Yogurt, another highly prevalent milk—derived product, has an entirely different consistency than cream cheese, as well as a fundamentally different flavor. In illustration, yogurt is considered to be a food, whereas cream cheese is considered to be a condiment. For example, yogurt, unlike cream cheese, is not a popular topping for bread products such as bagels. On the other hand, yogurt has a robust, desirable flavor. Yogurt also is typically lower than cream cheese in butterfat, cholesterol and sodium, and higher in protein.

A health-conscious consumer might well make the simple observation that nonfat yogurt has a robust, desirable flavor, find the concept of combining yogurt and cream cheese to be desirable, and thus attempt to combine these products together. However, due to the disparate properties of cream cheese and yogurt, including for example their differing consistencies, water content, and food chemistries, the combination of cream cheese and yogurt in mutually appreciable proportions only generates a runny mess. A consumer might then attempt to drain the liquid from the solid phase of the yogurt before combining in the cream cheese, thereby discarding whey from the yogurt.

Producing a cream cheese having an appealing consistency and utility, for example as a spreadable topping, is not possible by mixing cream cheese and yogurt without also adulterating these ingredients either by discarding whey from the yogurt or cream cheese, or by adding substantial proportions of gums and processed milk byproducts such as milk protein concentrate, whole milk protein, whey protein concentrate, casein, Baker's cheese, yogurt powder, and dry cottage cheese curd. At that point, the product is no longer cream cheese but a processed cheese spread, typically having inferior texture and nutritional value, and a flavor that is either bland or even mildly unpleasant. Efforts have also been made to produce so-called low-fat cream cheese, but again the resulting product has offered a bland, unremarkable and potentially unpleasant flavor. Hence, despite the broad popularity of cream cheese, its use typically entails consumer acceptance of a minimum butterfat content of 33% by weight, along with high cholesterol and sodium, and a bland, unremarkable taste.

Accordingly it would be highly desirable to provide a process for making an improved cream cheese product from a milkfat fluid, having the consistency of high-milkfat cream cheese but combining the desirable flavor and nutritional benefits of yogurt with the flavor of whey retained from the milkfat fluid, yielding a robust taste. The resulting yogurt cream cheese product would be a welcome substitute for its faintly-tasting high-fat progenitor while simultaneously improving cream cheese production economics and protecting the environment. Since the butterfat content of yogurt is typically between about 0% and about 3% by weight, and commonly less than about 0.5% by weight, the combination of yogurt into a cream cheese product also would desirably yield a cream cheese having a lower overall butterfat content and relatively higher protein content. Since cholesterol accompanies butterfat, the cholesterol content of this product would also be reduced.

SUMMARY OF THE INVENTION

In one embodiment according to the present invention, a process is provided for making a yogurt cream cheese product comprising steps of: providing a milkfat fluid having an initial butterfat content level; pasteurizing the milkfat fluid to yield a cream cheese precursor; providing a yogurt, and combining the yogurt with the cream cheese precursor to yield a combined precursor; and homogenizing and acidifying the combined precursor; yielding a yogurt cream cheese product. In another embodiment according to the present invention, culture bacteria are added to the milkfat fluid with agitation at an elevated temperature; and such bacteria are cultured in the milkfat fluid.

In another embodiment according to the present invention, a yogurt cream cheese product is provided, comprising between about 8% by weight and about 35% by weight of total butterfat; in which the yogurt cream cheese product comprises between about 10% by weight and about 40% by weight of yogurt; and in which the yogurt cream cheese product has a viscosity between about 1,000,000 centipoises and about 3,000,000 centipoises at a temperature of about 74° F.; and in which the yogurt cream cheese product yields less than about 1% syneresis by weight after 15 hours at about 74° F. to about 75° F.

A more complete understanding of the present invention, as well as other features and advantages of the present invention, will be apparent from the following detailed description and the accompanying drawings.

DETAILED DESCRIPTION

Figure 1:
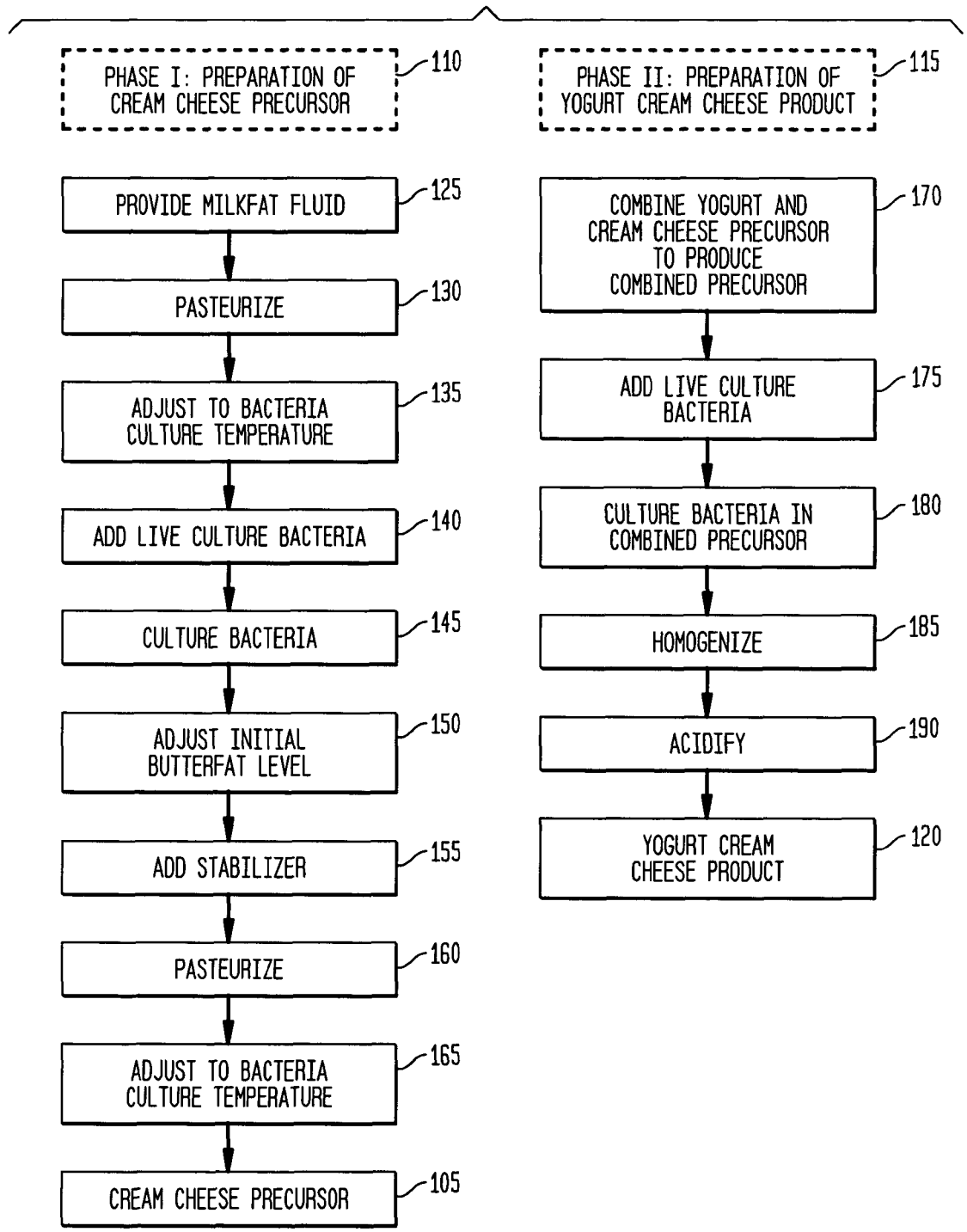
FIG. 1 is a flow chart of an exemplary process for making a yogurt cream cheese product according to the present invention.

Referring to FIG. 1, a flow chart of an exemplary process 100 is shown for making a yogurt cream cheese product according to the present invention. According to this process, a cream cheese precursor 105 is produced in phase I generally indicated at 110. Subsequent steps defined in phase II generally indicated at 115 result in production of a yogurt cream cheese product 120.

Phase 1 of process 100 begins with provision of a milkfat fluid at step 125. By milkfat is meant a composition comprising the fatty components of edible milk, for example, cow milk. Such fatty components, commonly referred to collectively as butterfat, can include, for example, triacylglycerols, diglycerides, monoacylglycerols, and other lipids. By fluid is meant a liquefied composition comprising milkfat, which can either be directly derived from milk, or reconstituted by hydrating a dehydrated milk product. For example, the milkfat fluid can be cream. The milkfat fluid can be formed from a mixture of sources, including, for example, whole milk, cream, skim milk, and dry milk.

In one embodiment according to the present invention, the milkfat fluid has a butterfat content between about 10% and about 50% by weight. In another embodiment according to the present invention, the milkfat fluid has a butterfat content between about 33% and about 50% by weight, suitable for preparation of a yogurt cream cheese. In a further embodiment according to the present invention, the milkfat fluid has a butterfat content between about 39% and about 50% by weight. In another embodiment according to the present invention, the milkfat fluid has a butterfat content between about 40% and about 44% by weight. In yet another embodiment according to the present invention, the milkfat fluid has a butterfat content between about 17% and about 33% by weight, suitable for preparation of a yogurt neufchatel cheese. Although much of the ensuing discussion is addressed to embodiments according to the present invention for preparation of a yogurt cream cheese product having a butterfat content between about 33% and about 50% by weight, it will be understood that the teachings according to the present invention may be applied to production of a yogurt neufchatel product having a butterfat content between about 17% and about 33% by weight, or to production of a yogurt light cream cheese product having a butterfat content between about 10% and about 17% by weight. The term yogurt cream cheese product as used herein therefore generally refers broadly to all of such products.

In an additional embodiment according to the present invention, the milkfat fluid has a water content between about 50% and about 60% by weight. For example, heavy cream may have a butterfat content of about 37% by weight, a protein content of about 2% by weight, and a water content of about 58% by weight, with the balance made up by other milk solids. Butterfat is an essential ingredient in cheese, as the butterfat is coagulated together with proteins and other elements into a curd and further processed to produce the cheese.

In a further embodiment according to the present invention, the milkfat fluid is pasteurized at step 130. Prior to this step, the milkfat fluid typically carries the wild bacteria load normally present in raw milk products. Pasteurization of the milkfat fluid is required at some point in order to kill these undesirable bacteria, as well as other undesired microbes to the extent reasonably feasible. Furthermore, if the milkfat fluid is to be subjected to culture bacteria in steps 140–145 or steps 175–180 discussed below, pasteurization needs to be completed in advance of those steps or the wild bacteria in the raw milkfat fluid will typically digest and thereby spoil the product. Where a source of pre-pasteurized milkfat fluid is employed, further pasteurization at this point may be unnecessary.

Pasteurization causes irreversible heat-induced denaturation and deactivation of bacteria. Effective pasteurization is a function of both time and temperature; pasteurization can be completed at higher temperatures in correspondingly shorter times. In one embodiment according to the present invention, pasteurization of the milkfat fluid in step 130 is carried out in a vat process at either a temperature of about 150° F. for about 30 minutes; or about 165° F. for about 15 minutes. Other effective time and temperature treatment parameters are known; and substitution of high surface area contact methods for the vat process can permit shorter effective treatment times. High temperature short time pasteurization for example, in which the milkfat fluid is pumped through an in-line tube within a temperature-controlled shell, can be used. Milkfat fluids having relatively high butterfat content generally require more heat exposure than low butterfat fluids in order to obtain effective pasteurization. Further background information on pasteurization of milk is provided in the Grade "A" Pasteurized Milk Ordinance published on May 15, 2002 by the U.S. Food & Drug Administration, particularly at pages 62 and 63; the entirety of which is hereby incorporated herein by reference.

Agitation is preferably provided and initiated prior to the heating process during pasteurization to facilitate even heating throughout the milkfat fluid and to avoid localized overheating. The force applied by the agitation should not be so strong as to substantially shear and thus degrade the proteins and butterfat in the milkfat fluid. Desirably, pasteurization is carried out in a tank equipped with heating and agitation means. Any suitable vessel can be used, such as, for example, a Groen kettle.

According to one embodiment of the present invention, the temperature of the milkfat fluid is adjusted at step 135 to a bacteria culture temperature. In another embodiment according to the present invention, the temperature of the milkfat fluid is adjusted to between about 65° F. and about 92° F. In an additional embodiment according to the present invention, the temperature of the milkfat fluid is adjusted to between about 70° F. and about 85° F. In yet a further embodiment according to the present invention, the temperature of the milkfat fluid is adjusted to about 82° F.

In one embodiment according to the present invention, culture bacteria are added to the milkfat fluid at step 140, and then cultured at step 145. The purpose of these steps is to generate robust culture-induced flavor in the milkfat fluid. Milk contains lactose sugars that can be digested by selected bacteria, producing lactic acid, glucose and galactose as metabolites. Hence, the culture bacteria generally are selected from among those that can digest lactose. Preferably, a strain of mesophilic bacteria suitable for culturing cream cheese is used. Such bacteria strains are typically chosen to produce diacetyl flavor. Bacteria strains may require ongoing rotational use, to prevent background bacteriophage populations from becoming resistant to a particular strain of bacteria, which can result in shutdown of the culture process and contamination of the product in production. For example, the culture bacteria may be selected from varying combinations of strains, preferably rotated on an ongoing basis, of (1) lactic acid—producing *Lactococcus lactis* subspecies *lactis* or subspecies *cremoris*; and (2) diacetyl flavor—producing *Lactococcus lactis* subspecies *diacetylactis* or *Leuconostoc* strains. Suitable bacteria strains are commercially available under the trade name pHage Control™ from Chr. Hansen, Bøge Allé 10–12, DK-2970 Hørsholm, Denmark. Grades 604 and 608 are particularly effective. These particular bacteria strain blends can be used continuously without rotation, provided that proper sanitation is maintained. Further suitable bacteria strains are commercially available under the trade names Flav Direct™ and DG™ Cultures from Degussa BioActives, 620 Progress Avenue, P.O. Box 1609, Waukesha, Wis. 53187-1609.

Once a culture bacteria strain or strain mixture is selected, an amount is added to a given batch of milkfat fluid that is effective to propagate live cultures throughout the batch in a reasonable time at the chosen culture temperature. For example, 500 grams of bacteria may be effective to inoculate up to 7,500 pounds of milkfat fluid using an inoculation proportion of about 0.015%. If desired, an inoculation proportion in the range between about 0.013% and about 0.026%, for example, may be used. In general, greater proportional additions of culture bacteria to a milkfat fluid batch will lead to somewhat reduced processing time, but at the expense of increased costs for the bacteria.

In one embodiment according to the present invention, the milkfat fluid is agitated following the addition of the culture bacteria, since the culture bacteria are typically added in a small proportion compared with the milkfat fluid, and hence desirably are dispersed so that they can act throughout the milkfat fluid. Agitation can if desired begin prior to addition of the culture bacteria, and can if desired be continued after dispersion of the culture bacteria. The shear force applied by the agitation should be sufficient to disperse the culture bacteria in a reasonable time, but not so strong as to substantially shear and thus degrade the culture bacteria or the proteins and butterfat in the milkfat fluid. In one embodiment according to the present invention, moderate agitation of the milkfat fluid containing the culture bacteria is continued for between about 10 minutes and about 25 minutes. In another embodiment according to the present invention, moderate agitation is continued for about 15 minutes.

In step 145, the bacteria, if added at step 140, are cultured in the milkfat fluid. In one embodiment according to the present invention, the milkfat fluid is held at a suitable temperature long enough for cultures of the selected bacteria to begin development, resulting in a slight thickening of the milkfat fluid. The necessary duration of such bacteria culturing depends on the level of bacteria activity, the selected culture temperature, the initial bacteria concentration, and the composition of the milkfat fluid. The bacteria digest lactose sugars in the milk. Higher culture temperatures and initial bacteria concentrations generally shorten the culture time needed. The temperature employed, however, must be within a range tolerable to the survival and growth of the selected culture bacteria. In one embodiment according to the present invention, the milkfat fluid is cultured with the selected bacteria for between about 60 minutes and about 90 minutes. A bacteria culture step of such a limited duration generates a mild thickening of the milkfat fluid.

In one embodiment according to the present invention, the butterfat content of the milkfat fluid is standardized at step 150 to a desired level. The butterfat content of the final yogurt cream cheese product can then be projected based on the proportion of yogurt to be used, and its butterfat content. For example, cream cheese is defined to include a minimum butterfat content of 33% by weight. Given the variable nature of raw milk, for example, standardization of the butterfat content in a given batch of milkfat fluid may generally be desirable in furtherance of process stability and production of a uniform product. According to one embodiment of the present invention, the butterfat content of the milkfat fluid is adjusted to between about 33% and about 50% by weight. According to another embodiment of the present invention, the butterfat content of the milkfat fluid is adjusted to between about 33% and about 36% by weight. According to a further embodiment of the present invention, the butterfat content of the milkfat fluid is adjusted to between about 33% and about 34% by weight. According to yet another embodiment of the present invention, the butterfat content of the milkfat fluid is adjusted to about 34.5% by weight. According to yet another embodiment of the present invention, the butterfat content of the milkfat fluid is adjusted to between about 17% and about 33% by weight. According to yet a further embodiment of the present invention, the butterfat content of the milkfat fluid is adjusted to between about 10% and about 17% by weight.

In general, the texture and mouth feel of cream cheese improves with higher butterfat content. Higher butterfat levels also provide better tolerance of the milkfat fluid to processing steps, such as agitation shear that can degrade protein and butterfat molecules. However, higher butterfat levels also lead to a correspondingly higher butterfat content in the finished cream cheese, which is undesirable from a health standpoint. This standardization can alternatively be carried out prior to culturing the bacteria at step 145, but this practice generally is not preferred.

The initial butterfat level present in a given batch of milkfat fluid can be measured, for example, using a standard Babcock test. For background, see Baldwin, R. J., "The Babcock Test," Michigan Agricultural College, Extension Division, Bulletin No. 2, Extension Series, March 1916, pp. 1–11; the entirety of which is herein incorporated by reference. Where the initial butterfat level present in a given batch of milkfat fluid is too high, adjustment can be accomplished by adding a nonfat material such as skim milk. Addition of water is generally ineffective since the water content of the curd directly affects the product texture, and the feasibility of adding water alone to adjust the butterfat level in the final product is accordingly limited. In one embodiment according to the present invention, the butterfat content of a batch of milkfat fluid is downwardly adjusted by addition of an appropriate amount of nonfat dry milk together with adequate water to rehydrate the nonfat dry milk, which has the advantage of not contributing excess water to the batch. In the event that the initial butterfat level present in a given batch of milkfat fluid needs to be upwardly adjusted, this can be accomplished by addition of a material containing a higher concentration of butterfat, such as, for example, cream.

According to further embodiments of the present invention, the relative concentrations of butterfat, milkfat protein, and water are all addressed. As explained above, the butterfat content of the final yogurt cream cheese product is selected as desired. For example, cream cheese generally needs to include at least about 33% by weight of butterfat. Regarding protein, higher concentrations are generally desirable for nutritional considerations. Water is a secondary ingredient that is necessary to a reasonable degree to facilitate processing, as well as to provide a desirable texture in the product. However, excessive water will not be retained in the curd and hence becomes a processing hindrance and expense, and a disposal issue. In one embodiment according to the present invention, the milkfat fluid comprises: about 34.5% to about 50% butterfat, about 3% to about 7% milk protein, and about 59% to about 42% water, with the balance constituted by other milk solids.

Referring to FIG. 1, a stabilizer is desirably added to the milkfat fluid at step 155. Stabilizers thicken the milkfat fluid by binding water, which may contribute to retention of whey in the milkfat fluid during subsequent processing. Step 155 is preferably carried out after completion of any bacteria culture in steps 135–145 and after completion of any standardization of the butterfat level at step 150; but can be carried out if desired at an earlier stage in phase I as generally indicated at 110. Step 155 can also be carried out if desired at a later stage in the process shown in FIG. 1. However, step 155 is preferably completed prior to homogenization step 185 discussed further below, so that any lumpy texture in the product resulting from stabilizer addition is corrected during homogenization.

The stabilizer may be selected from, for example, gums, salts, emulsifiers, and their mixtures. Suitable gums include, for example, locust bean gum, xanthan gum, guar gum, gum arabic, and carageenan. Suitable salts include, for example, sodium chloride and potassium chloride. Suitable emulsifiers include, for example, sodium citrate, potassium citrate, mono-, di-, and tri-sodium phosphate, sodium aluminum phosphate, sodium tripolyphosphate, sodium hexametaphosphate, dipotassium phosphate, and sodium acid pyrophosphate. In one embodiment according to the present invention, the stabilizer is K6B493, a milled, dry product that is commercially available from CP Kelco US, Inc., 1313 North Market Street, Wilmington, Del. 19894-0001. Gum arabic is commercially available from TIC Gums Inc., Belcamp, Md. Gum-based stabilizers typically contain sodium, which should be taken into account in order to avoid excessive sodium concentrations in the final yogurt cream cheese product. For this reason, use of salts as stabilizers is also not preferred. However, the incorporation of a significant proportion of yogurt into the final product reduces the proportional sodium content, as yogurt typically has a low sodium concentration.

Preferably, an amount of a stabilizer effective to cause a moderate thickening of the milkfat fluid is added. For example, a stabilizer may be added in an amount constituting between about 0.2% by weight to about 0.5% by weight of the yogurt cream cheese product. In another embodiment, a stabilizer may be added in an amount constituting about 0.45% by weight of the yogurt cream cheese product. As the butterfat content of the chosen milkfat fluid is reduced, the proportion of stabilizer used preferably is increased.

In one embodiment according to the present invention, bacteria culture step 145 is terminated by initiating pasteurization at step 160 before substantial thickening of the milkfat fluid occurs. Limiting bacteria culture step 145 to a mild thickening of the milkfat fluid according to this embodiment of the present invention is a fundamental and major departure from normal production of cream cheese, in which bacteria culture is typically permitted to run its course until the pH of the milkfat fluid is reduced to a range between about 5.0 and about 4.1. In the case of such a mild bacteria culture step, there may be very little change in the pH of the milkfat fluid. In one embodiment according to the present invention, the temperature of the milkfat fluid is gradually raised during processing in phase I, so that the temperature continues to rise after completion of bacteria culture in step 145. Hence, pasteurization is initiated in due course when the milkfat fluid reaches an effective pasteurization temperature.

In an alternative embodiment according to the present invention, the bacteria added to the milkfat fluid at step 140 may be cultured for a sufficient time to partially or substantially digest the milkfat fluid, as limited by the attendant pH reduction. Lactic acid is formed as a byproduct of metabolism of lactose by the bacteria in step 145. Hence, the measured pH of the milkfat fluid, which gradually decreases with lactic acid buildup, is an indication of the progress of the bacteria culture. If it is desired, for example, to substantially digest the milkfat fluid, then the bacteria culture step 145 may be continued until the pH of the milkfat fluid is within a range of about 5.0 to about 4.1, or within a range of about 4.6 to about 4.4, at either of which points the bacteria activity becomes substantially dormant.

In one embodiment according to the present invention, the cream cheese precursor is then cooled at step 165 to a bacteria culture temperature. Once the pasteurization of the milkfat fluid is completed, it is generally desirable to promptly lower the temperature of the cream cheese precursor to a more moderate level in order to reduce ongoing heat damage to the butterfat and milk proteins. In addition, it may be desired to further culture bacteria in the cream cheese precursor at steps 175–180 of phase II, as will be discussed further below. The high temperatures necessary for pasteurization cannot then be maintained, because they will kill the culture bacteria. Preferably, the cream cheese precursor is cooled to a temperature that will facilitate reaching an appropriate temperature for carrying out phase II. In one embodiment according to the present invention, the cream cheese precursor is cooled to a temperature between about 90° F. and about 125° F. In another embodiment according to the present invention, the cream cheese precursor is cooled to a temperature between about 110° F. and about 120° F. If, alternatively, the cream cheese precursor 105 will be stored prior to further processing, then it is preferably cooled to a refrigeration temperature such as, for example, a temperature between about 34° F. and about 38° F.

The resulting cream cheese precursor 105 is then ready for further processing according to phase II generally indicated at 115 in FIG. 1. This cream cheese precursor is a uniform, fluid material containing the butterfat and whey from the milkfat fluid. The cream cheese precursor is substantially free of bacterial activity due to its pasteurization, unless the culture bacteria have been added following pasteurization, for example so that they can be permitted to digest the milkfat fluid through to a pH of between about 5.0 and about 4.1, or through to a pH of between about 4.6 and about 4.4. The preparation of the cream cheese precursor does not require and preferably does not include homogenization or acidification at any point in phase I generally indicated at 110, which are steps normally included in preparation of cream cheese, although these steps can be undertaken if desired. In further embodiments according to the present invention the cream cheese precursor is not subjected to a full bacteria culture that would take the product pH and texture to its normal completion in production of cream cheese. Acidification at this point, for example, would cause the curd and whey to separate, defeating the goal of including the whey in the final yogurt cream cheese product. Homogenization, for example, is wholly unnecessary at this stage of the production of the yogurt cream cheese product. Homogenization at this point would subject the cream cheese precursor to unnecessary processing that would needlessly increase the processing time and costs, while not substantially contributing to the quality of the final yogurt cream cheese product.

The cream cheese precursor produced according to the process of the present invention is not cream cheese. Substitution of cream cheese for the cream cheese precursor as an ingredient in step 170 to be discussed below defeats the desirable goal of providing a cream cheese product having retained whey, because whey is separated from the curd in conventional cream cheese production. Moreover, cream cheese and yogurt cannot be directly combined in mutually substantial proportions to yield a homogenous single-phase product.

Although the process according to the present invention does not produce conventional cream cheese, nevertheless conventional cream cheese can if desired be an ingredient in the yogurt cream cheese product. For example, conventional cream cheese can, if desired, be added to the cream cheese precursor in any desired proportion. As the proportion of conventional cream cheese in the final yogurt cream cheese product increases, the benefits of the teachings according to the present invention are achieved to a correspondingly reduced degree.

Referring to FIG. 1, the cream cheese precursor and a source of yogurt are then combined at step 170 to produce a combined precursor. In general, any yogurt may be used. Yogurt is broadly defined as a milkfat fluid that is cultured by at least one bacteria strain that is suitable for production of yogurt. In one embodiment according to the present invention, the yogurt comprises: about 0% to about 3% butterfat, about 3% to about 6% milk protein, and about 76% to about 88% water. In another embodiment according to the present invention, the yogurt comprises: about 0.5% to about 3.25% butterfat, about 3.47% to about 5.25% milk protein, and about 76% to about 88% water. In yet a further embodiment according to the present invention, the yogurt comprises: about 0.5% to about 2.0% butterfat, about 5% milk protein, and about 85% water. In still another embodiment according to the present invention, the yogurt comprises about 0.16% butterfat, about 5.12% milk protein, and about 76% water. In general, any of the foregoing yogurts will have a total solids content of at least about 8% by weight.

Figure 2:
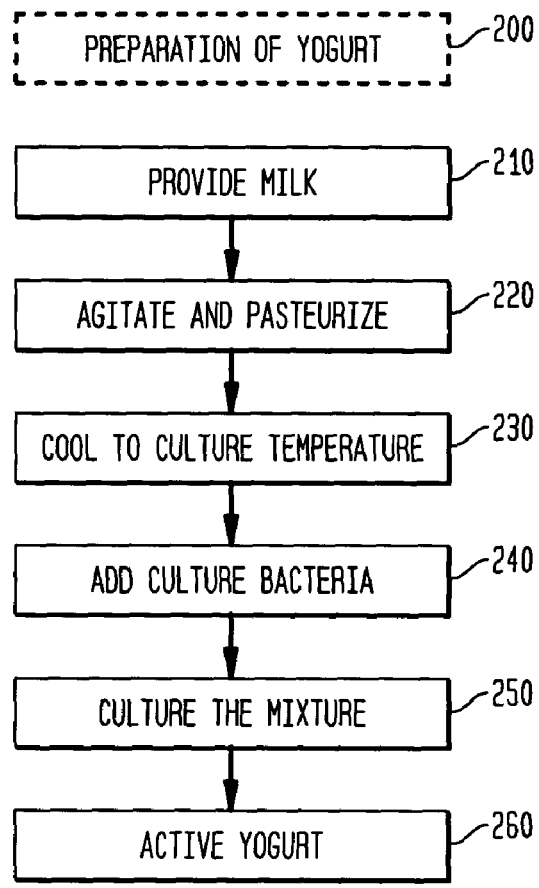
FIG. 2 is a flow chart of an exemplary process for making yogurt for incorporation as an ingredient in the process according to FIG. 1.

In one embodiment according to the present invention, suitable yogurt is prepared according to the exemplary process 200 shown in FIG. 2. Referring to FIG. 2, milk is provided at step 210. The milk employed to produce the yogurt can be, for example, whole milk, reduced fat milk, or skim milk. Butterfat present in the milk facilitates processing because butterfat contributes to the feasibility of thickening the final product to a desirable consistency. However, butterfat present in the milk used in producing the yogurt also results in a higher butterfat concentration in the final yogurt cream cheese product. In one embodiment according to the present invention, the milk employed to produce the yogurt accordingly is skim milk. In another embodiment according to the present invention, the butterfat content of the milk is less than 1% by weight. In any case, the selected milk can be directly sourced from liquid milk such as cow milk, or it can be reconstituted from dry milk.

In a further embodiment according to the present invention, the solids level of the milk to be used in preparing the yogurt is standardized to between about 18% and about 22% by weight. In another embodiment according to the present invention, the solids level of the milk is standardized to about 20% by weight. Alternatively, the solids level of the milk can be standardized to between about 10% and about 12% by weight, as is employed in conventional preparation of yogurt. However, such a relatively low solids level can hinder production of a final yogurt cream cheese product having a desirably thick texture. The solids content of the milk provided at step 210 can be increased if desired by any process suitable to yield a condensed milk. Condensation processes that do not involve heating the milk, such as ultrafiltration, are preferred in order to reduce processing damage of the milk.

At step 220, the milk is pasteurized. Pasteurization should generally be carried out as earlier discussed, for example, at a temperature of at least about 165° F. for at least about 15 minutes. In one embodiment according to the present invention, pasteurization of the milk is carried out at a temperature of about 162° F. to about 165° F. for about 30 minutes to about 15 minutes. Agitation should be provided to facilitate even heating of the milk and to avoid localized overheating.

At step 230, the milk is then cooled to a bacteria culture temperature. Once the pasteurization of the milk is completed, it is generally desirable to promptly lower the temperature of the milk to a more moderate level in order to reduce ongoing heat damage. In addition, bacteria will be cultured in the milk at steps 240–250, as will be discussed further below. As pointed out above, the high temperatures necessary for pasteurization cannot persist when the culture bacteria are added at step 240. In one embodiment according to the present invention, the milk is cooled at step 230 to a temperature between about 90° F. and about 115° F. In another embodiment according to the present invention, the milk is cooled at step 230 to a temperature between about 106° F. and about 110° F. In yet a further embodiment according to the present invention, the milk is cooled at step 230 to a temperature of about 108° F.

At step 240, culture bacteria are added to the milk. Since yogurt is the desired product of the process in FIG. 2, bacteria strains that are suitable for production of yogurt are used. For example, *Lactobacillus delbrueckii* subspecies *bulgaricus, Streptococcus thermophilus, Lactobacillus acidophilus, Bifidobacterium*, and *Lactobacillus paracasei* subspecies *casei* can be used. If available, other lactic acid—producing bacteria strains suitable for making yogurt can be used. Suitable yogurt culture bacteria strains are commercially available under the trade name Yo-Fast® from Chr. Hansen, Bøge Allé 10–12, DK-2970 Hørsholm, Denmark. In one embodiment according to the present invention, F-DVS YoFast®-10 is used, which contains blended strains of *Streptococcus thermophilus, Lactobacillus delbrueckii* subspecies *bulgaricus, Lactobacillus acidophilus, Bifidobacterium*, and *Lactobacillus paracasei* subspecies *casei*. In another embodiment according to the present invention, DVS YoFast®-2211 is used. Further suitable bacteria strains are commercially available under the trade names Ultra-Gro® and Sbifidus® from Degussa BioActives, 620 Progress Avenue, P.O. Box 1609, Waukesha, Wis. 53187-1609.

Once a culture bacteria strain is selected, an amount is added to the milk that is effective to propagate live cultures throughout a given batch of milk in a reasonable time at the chosen culture temperature. In general, greater proportional additions of culture bacteria to a milk batch will reduce processing time, but at the expense of increased costs for the bacteria.

In one embodiment according to the present invention, the milk is agitated following the addition of the culture bacteria, since the culture bacteria are typically added in a small proportion compared with the milk, and desirably are dispersed so that they can act throughout the milk. Agitation can if desired begin prior to addition of the culture bacteria, and can if desired be continued after dispersion of the culture bacteria. The shear force applied by the agitation should be sufficient to disperse the culture bacteria in a reasonable time, but not so strong as to shear and thus degrade the culture bacteria or the proteins and butterfat in the milk. In one embodiment according to the present invention, moderate agitation of the milk containing the culture bacteria is continued for between about 10 minutes and about 25 minutes. In another embodiment according to the present invention, moderate agitation is continued for about 15 minutes.

In step 250, the bacteria added at step 240 are cultured in the milk. The milk is held at a suitable temperature for cultures of the selected bacteria to develop for a sufficient time so that there is visible curd formation throughout the milk, resulting in a substantial thickening. In one embodiment according to the present invention, the milk is held at a temperature between about 106° F. and about 110° F. In another embodiment according to the present invention, the milk is held at a temperature of about 108° F. The necessary duration of the bacteria culturing depends on the level of bacteria activity, the selected culture temperature, the initial bacteria concentration, and the composition of the milk. In one embodiment according to the present invention, the milk is cultured with the selected bacteria for between about 4 hours and about 6 hours. In another embodiment according to the present invention, the milk is cultured with the selected bacteria at a temperature of about 108° F. for about 6 hours.

Lactic acid is formed as a byproduct of metabolism of lactose by the bacteria in step 250. Hence, the measured pH of the milk, which gradually decreases with lactic acid buildup, is an indication of the progress of the bacteria culture. Further, when the pH of the milk reaches about 4.4, the level of bacterial activity begins to markedly decrease. In one embodiment according to the present invention, the bacteria culture step 250 is continued until the pH of the milk is within a range of about 5.0 to about 4.1. In another embodiment according to the present invention, the bacteria culture step 250 is continued until the pH of the milk is within a range of about 4.6 to about 4.4; and more preferably about 4.5.

When the bacteria culture step 250 is complete, the resulting product is yogurt 260 containing live bacteria cultures. Preferably, the yogurt has a uniform consistency with a solids content of at least about 8%.

Returning to FIG. 1, phase II begins with combining the cream cheese precursor and a yogurt source together at step 170 to yield a combined precursor. Bacteria may be cultured in the combined precursor at step 180, to be discussed below. Accordingly, yogurt and the cream cheese precursor desirably are simultaneously prepared so that phase II of FIG. 1 as generally indicated at 115 can then immediately be carried out. In this manner, the active yogurt 260 is already at a suitable temperature for any further bacteria culture to be carried out at step 180; and the cream cheese precursor 105 can be cooled at step 165 to that same suitable temperature or to another compatible temperature. Alternatively, if the yogurt 260 is prepared in advance of undertaking phase II of FIG. 1, then the yogurt should be cooled in the meantime to a refrigeration temperature such as, for example, between about 34° F. and about 38° F., to retard unwanted continuation of bacterial activity, and then reheated.

In one embodiment according to the present invention, the cream cheese precursor and yogurt are combined in step 170 of FIG. 1 at selected temperatures, in selected proportions, and in a selected manner.

Assuming that the above-discussed preparations of the cream cheese precursor and yogurt have been simultaneously completed, the respective temperatures of these ingredients are preferably controlled with attention both to preserving live culture bacteria in the yogurt and to minimizing further heating and cooling operations. Desirably, the cream cheese precursor and yogurt are both maintained at a temperature suitable for bacteria culture. If either ingredient to be so used is either too hot or too cold, its temperature can be adjusted. In one embodiment according to the present invention, the temperatures of both the cream cheese precursor and the yogurt are adjusted to between about 90° F. and about 120° F. In another embodiment according to the present invention, the temperatures of both the cream cheese precursor and the yogurt are adjusted to between about 110° F. and about 120° F.

The proportions of cream cheese precursor and yogurt to be combined at step 170 are a matter of discretion. However, the cream cheese precursor typically contains a relatively higher concentration of butterfat, and the yogurt typically contains a relatively lower concentration of butterfat, cholesterol and sodium, and a relatively higher concentration of milk protein. Further, a substantial proportional addition of yogurt to the cream cheese precursor contributes the robust flavor, reduced cholesterol, and healthful active bacteria cultures of yogurt to the overall product. Hence, according to one embodiment of the present invention a sufficient proportion of yogurt is used relative to a given batch of cream cheese precursor, to yield a desired substantial improvement in the flavor and substantial influence of the beneficial constituents in the yogurt on their mixture relative to that in the cream cheese precursor.

According to another embodiment of the present invention, the mixture of cream cheese precursor and yogurt is controlled to comprise between about 10% and about 40% by weight of yogurt. In an additional embodiment according to the present invention, the mixture of cream cheese precursor and yogurt is controlled to comprise between about 14% and about 30% by weight of yogurt. According to a further embodiment of the present invention, the mixture of cream cheese precursor and yogurt is controlled to comprise about 14% and about 22% by weight of yogurt. According to an additional embodiment of the present invention, the mixture of cream cheese precursor and yogurt is controlled to comprise about 20% by weight of yogurt. Where flavorings are to be added to the cream cheese product, slightly lower proportions of yogurt generally are preferred, for example about 14% to about 18% by weight of yogurt, and more preferably about 16% by weight of yogurt.

The cream cheese precursor and the yogurt can generally be combined together in any suitable manner. Where the relative proportion of yogurt is small compared to the proportion of cream cheese precursor, it is generally easier to combine the minor yogurt ingredient into the major cream cheese precursor ingredient. If the cream cheese precursor is at a temperature that is above the range of temperatures tolerable to the active culture bacteria in the yogurt, then preferably the yogurt is provided at a temperature substantially below the maximum temperature tolerable to the yogurt and substantially below the temperature of the cream cheese precursor, so that the cream cheese precursor is cooled on contact with the yogurt. In one embodiment according to the present invention, the yogurt is chilled to a temperature between about 34° F. and 36° F. In general, the cream cheese precursor and the yogurt are combined with moderate agitation for a time sufficient to thoroughly mix them together. Care should again be taken to minimize shearing of milk proteins, butterfat, and the live culture bacteria. In one embodiment according to the present invention, moderate agitation of the combined ingredients is continued for between about 15 minutes and about 20 minutes.

At step 175, live culture bacteria may desirably be added to the combined precursor. If the yogurt employed at step 170 contains live bacteria cultures, this step may be completely unnecessary. Alternatively, if the selected yogurt does not contain live bacteria cultures, then such cultures may, if desired, be added at step 175. In another embodiment according to the present invention in which the cream cheese precursor was not subjected to culture of bacteria at step 145, culture by yogurt bacteria may be carried out at this point. In general, culture bacteria can be so added if desired following the guidelines discussed above regarding step 240 of FIG. 2, preferably with agitation. Live yogurt bacteria cultures themselves provide well-known health benefits to the consumer, and accordingly are preferably included in the final yogurt cream cheese product. Although the combined precursor can also or alternatively be cultured by cream cheese culture bacteria such as may be employed at step 140, such cream cheese bacteria do not typically provide the health benefits that are provided to the consumer by live yogurt bacteria.

In one embodiment according to the present invention, yogurt bacteria are then cultured in the combined precursor at step 180. The combined precursor is held at a suitable temperature for cultures of the selected bacteria to develop for a sufficient time so that there is visible curd formation throughout the combined precursor, resulting in a substantial thickening and a significant reduction in the pH. In one embodiment according to the present invention, the combined precursor is held at a temperature between about 110° F. and about 120° F. In another embodiment according to the present invention, the combined precursor is held at a temperature of about 108° F. In an additional embodiment according to the present invention, the combined precursor is cultured with the selected bacteria for between about 4 hours and about 6 hours. In another embodiment according to the present invention, the combined precursor is cultured with the selected bacteria at a temperature of about 108° F. for about 6 hours. In yet a further embodiment according to the present invention, the bacteria culture step 180 is continued until the pH of the combined precursor is within a range of about 5.0 to about 4.1, more preferably about 4.6 to about 4.4, and still more preferably about 4.5.

At step 185, the combined precursor is homogenized by subjecting it to an elevated pressure at an elevated temperature for a suitable period of time. Application of such an elevated pressure breaks down the butterfat globules in the combined precursor, resulting in substantially increased uniformity. In general, the elevated pressure can be applied to the combined precursor by any suitable means, such as, for example, hydraulic or mechanical force. In one embodiment according to the present invention, the combined precursor is compressed to the selected pressure and then passed through an orifice to quickly reduce such pressure. In another embodiment according to the present invention, homogenization is carried out at a controlled temperature between about 120° F. and about 125° F. Although higher temperatures can be used, desirably a temperature is chosen that will not kill the live culture bacteria in the product. Homogenization can be carried out, for example, in a Gaulin homogenizer. Preferably, homogenization is carried out after completion of any desired bacteria culture at step 180, but the order of such steps can be inverted.

In one embodiment according to the present invention, the homogenization pressure is between about 2,000 pounds per square inch (PSI) to about 4,000 PSI. In another embodiment according to the present invention, the homogenization pressure is between about 2,500 PSI to about 3,200 PSI. As the applied pressure increases, the resulting viscosity of the final yogurt cream cheese product accordingly increases. Hence, the pressure to be applied is preferably chosen to yield a final product of the desired consistency.

At step 190, the combined precursor is acidified to a pH suitable to retard activity of the culture bacteria, and to coagulate the combined precursor to yield the yogurt cream cheese product 120. Preferably, acidification at step 190 is carried out after homogenization at step 185 is completed. Acidification causes substantial thickening of the combined precursor, and may hinder homogenization if previously carried out. However, the order of homogenization step 185 and acidification step 190 can be inverted so that acidification is carried out first, if desired; or these steps can be concurrently carried out. In one embodiment according to the present invention, the pH is adjusted to within a range of about 5.0 to about 4.1, more preferably about 4.6 to about 4.4, and still more preferably about 4.5. In another embodiment in accordance with the present invention, the pH is adjusted by adding an appropriate amount of an edible acid to the combined precursor.

Edible acids include, for example, lactic acid, phosphoric acid, acetic acid, citric acid, and mixtures. For example, a suitable aqueous mixture of edible acids having a pH between about 0.08 and about 1.4 is available under the trade name Stabilac® 12 Natural from the Fantasy-BlankeBaer Corporation, 1572 Larkin Williams Rd., Fenton, Mo. 63026-3009. In another embodiment according to the present invention, the edible acid is lactic acid, being the metabolite naturally produced by the lactose-consuming bacteria that are used in producing the yogurt and the cream cheese precursor.

Since the thickness of the resulting product increases as the pH is reduced, edible acid addition can be used to control the thickness of the final yogurt cream cheese product. Furthermore, live culture bacteria in the final product cannot survive at a pH substantially below 4.4, hence acidification substantially slows down their further propagation in the product, extending its shelf life. However, the yogurt bacteria are not killed by this acidification process, and thus can still provide the health benefits of active yogurt cultures to the consumer. The edible acid present in the final yogurt cream cheese product also serves to provide a good-tasting bite to the flavor.

In an alternative embodiment, a coagulating enzyme can be substituted for or used in conjunction with acidification. Enzymatic coagulation typically causes the whey to separate from the curd, and accordingly enzymatic coagulation generally is not preferred. However, it may be feasible to reincorporate the whey into the combined precursor so long as the enzyme coagulation is carried out before homogenization. Enzymatic coagulation also typically takes a long time, 12 hours for example, which is another disadvantage of its use in the process. In general, any suitable coagulating enzyme of animal-, plant-, microbial, or other origin can be used. In one embodiment, the coagulant enzyme is chymosin, also referred to as rennin, which is the active component of rennet. Rennet is purified from calf stomachs. Chymosin breaks down a milk protein, casein, to paracasein. Paracasein then combines with calcium to form calcium paracaseinate, which precipitates and starts formation of a solid mass. Milkfat and water then become incorporated into the mass, forming curds. One part rennin can coagulate about 10,000 to about 15,000 parts milkfat fluid. Alternatively, pepsin, which is purified from the stomachs of grown calves, heifers, or pigs, can be used.

The temperature of the yogurt cream cheese product is preferably reduced to a suitable refrigeration temperature, such as, for example, about 34° F. to about 38° F. If desired, a suitable preservative can be added to the yogurt cream cheese product to retard yeast and mold growth. For example, potassium sorbate, sodium benzoate, sorbic acid, ascorbic acid or nisin can be added, preferably before acidification to facilitate their dispersion in minor proportion throughout the yogurt cream cheese product. Nisin, for example, is a protein made by *Lactococcus lactis*. Further, if desired, flavorings, condiments and the like can be added. Adjuvants that are vulnerable to attack by the live bacteria are preferably added after reducing the temperature of the yogurt cream cheese product, and may need to be made resistant to such bacteria.

The yogurt cream cheese product made according to the process of the present invention generally has the appearance, consistency, and texture of cream cheese. In addition, this product has the robust, desirable flavor of yogurt. Further, the product includes retained whey from the milkfat fluid, which dramatically amplifies the flavor of the product, giving it a greatly superior and robust taste. Retention of the whey in this manner adds natural flavor without subjecting the product to large proportions of adulterating additives or heavy extra processing steps, and eliminates the pollution and economic loss resulting from whey separation in conventional cream cheese production. In addition, the yogurt cream cheese product has reduced cholesterol and sodium.

Cream cheese by definition contains at least 33% butterfat. In one embodiment in accordance with the present invention, the yogurt cream cheese product accordingly comprises between about 33% and about 40% butterfat. Neufchatel cheese by definition contains between about 17% and about 33% butterfat. In one embodiment in accordance with the present invention, the yogurt cream cheese product accordingly comprises between about 17% and about 33% butterfat. Low-fat cream cheese by definition contains between about 10% and about 17% butterfat. In one embodiment in accordance with the present invention, the yogurt cream cheese product accordingly comprises between about 10% and about 17% butterfat.

Addition of significant proportions of yogurt tends to somewhat reduce the butterfat content of the overall yogurt cream cheese product. Thus, in one embodiment according to the present invention, the yogurt cream cheese product comprises between about 8% by weight and about 35% by weight of butterfat. In another embodiment according to the present invention, the yogurt cream cheese product comprises between about 10% by weight and about 26% by weight of butterfat. In yet another embodiment according to the present invention, the yogurt cream cheese product comprises between about 23% by weight and about 26% by weight of butterfat. In yet a further embodiment according to the present invention, the yogurt cream cheese product comprises between about 25% by weight and about 26% by weight of butterfat. In yet a further embodiment according to the present invention, the yogurt cream cheese product further comprises 2% by weight and about 14% by weight of milk protein, more preferably between about 3% by weight and about 8% by weight of milk protein, and still more preferably between about 4% by weight and about 5% by weight of milk protein. In another embodiment according to the present invention, the yogurt cream cheese product comprises between about 0.05% and about 0.09% by weight of cholesterol; between about 0.2% by weight and 0.4% by weight of sodium; and between about 58% by weight and 63% by weight of water.

Various highly processed dairy derivatives have the potential for use in modifying the flavor and texture of cream cheese products. These derivatives include, for example, milk protein concentrate, whole milk protein, whey protein concentrate, casein, Baker's cheese, yogurt powder and dry cottage cheese curd. Milk protein concentrate, for example, is produced by ultrafiltration of milk. Such materials could be added to the yogurt cream cheese product made in accordance with the present invention, or introduced during preparation of the product. However, their use is not preferred, and can by practice according to the present invention be minimized. Furthermore, addition of such agents generally is a poor substitute for the retention of whey from the milkfat fluid and the incorporation of yogurt, both such desirable results being as achieved in accordance with the present invention. In one embodiment according to the present invention, at least about 40% of the milk protein in the yogurt cream cheese product is derived from the milkfat fluid and yogurt. In another embodiment according to the present invention, at least about 50% of the milk protein in the yogurt cream cheese product, and potentially in excess of 60% of the milk protein in the yogurt cream cheese product, is derived from the milkfat fluid and yogurt.

Syneresis leads to an unattractive and wasteful phase separation between curds and whey when milk is directly coagulated. In one embodiment according to the present invention, the yogurt cream cheese product exhibits substantially no syneresis, or less than about 1% syneresis by weight, after 15 hours at about 74° F. to about 75° F.

The texture and consistency of the yogurt cream cheese product made in accordance with one embodiment of the present invention is the same as that of ordinary cream cheese. For example, the yogurt cream cheese product may have a viscosity between about 1,000,000 centipoises and about 3,000,000 centipoises at a temperature of about 74° F. In another embodiment according to the present invention, the yogurt cream cheese product has a viscosity between about 1,000,000 centipoises and about 2,000,000 centipoises at a temperature of about 74° F. Viscosity is conventionally measured, using, for example, a Brookfield viscometer.

Figure 3:
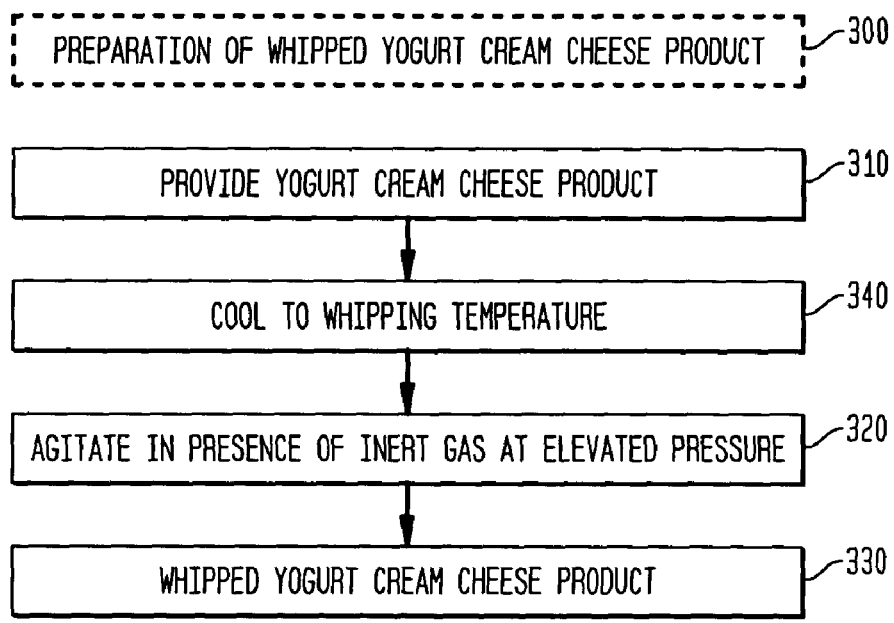
FIG. 3 is a flow chart of an exemplary process for making a whipped yogurt cream cheese product according to FIG. 1.

In yet a further embodiment according to the present invention, the consistency of the yogurt cream cheese product can be modified to yield a whipped, more easily spreadable product. Referring to FIG. 3, an exemplary process 300 for carrying out a whipping operation is shown. The process begins with providing a yogurt cream cheese product at step 310, in accordance with the above teachings. At step 320, the yogurt cream cheese product is agitated in the presence of an inert gas at an elevated pressure. For example, the yogurt cream cheese product can be passed through a confined space having agitation means, while being simultaneously subjected to an inert gas at an elevated pressure.

In one embodiment according to the present invention, the gas is provided at an initial pressure between about 150 PSI and about 240 PSI. In another embodiment according to the present invention, the inert gas is provided at an initial pressure between about 220 PSI and about 240 PSI. In yet a further embodiment according to the present invention, the pressure of the inert gas is controlled throughout the agitation means in order to expose the yogurt cream cheese product to a desired pressure for a defined time as it travels through the agitation means. In another embodiment according to the present invention, the inert gas is injected into the agitation means at a chosen initial pressure, which is then permitted to dissipate in the region of the agitation means. In one embodiment according to the present invention, the yogurt cream cheese product is exposed to a desired pressure for between about 3 seconds and about 6 seconds. In an additional embodiment according to the present invention, the yogurt cream cheese product is exposed to a desired pressure for between about 4 seconds and about 5 seconds. Although any inert gas can be used, nitrogen is the typical and most practical choice.

Desirably, the temperature of the yogurt cream cheese product is reduced to a whipping temperature as indicated at step 340, and so maintained or further modified during step 320. For example, a scraped surface heat exchanger, such as a Waukesha Cherry-Burrell Thermutator® or Votator®, can be used to provide the needed agitation while simultaneously controlling the temperature. In one embodiment according to the present invention, the yogurt cream cheese product is cooled to a whipping temperature between about 70° F. and about 90° F., more preferably about 80° F., at step 340. A temperature between about 60° F. and about 70° F., more preferably about 68° F., is employed within the agitation means at step 320. In another embodiment according to the present invention, the yogurt cream cheese product is cooled to a whipping temperature of about 80° F. at step 340, and then a temperature of about 68° F. is employed within the agitation means at step 320. Using higher temperatures counteracts the effect of the pressurized gas in causing the yogurt cream cheese product to expand into whipped form and accordingly is to be avoided.

The agitation within the scraped surface heat exchanger may be controlled to a desired level in order to maintain the yogurt cream cheese product within the exchanger for an adequate time for the pressurized inert gas to act on the product. The normal operating speed of the agitator in a Waukesha Cherry-Burrell Thermutator® or Votator® may need to be reduced, for example to between about 800 and 1,000 revolutions per minute, in order to avoid excessive shear. In order to facilitate further reduction of the temperature of the yogurt cream cheese product in the course of passage through the scraped surface heat exchanger, such exchanger is equipped to withdraw heat from the product, which is then dissipated in a suitable manner. In one embodiment according to the present invention, two scraped surface heat exchangers are operated in series so that the yogurt cream cheese product is successively passed through both exchangers, which jointly cool and apply pressurized inert gas to the yogurt cream cheese product.

The resulting product indicated at 330 is a whipped yogurt cream cheese product. The texture and consistency of the yogurt cream cheese product made in accordance with one embodiment of the present invention is the same as that of ordinary whipped cream cheese. For example, the whipped yogurt cream cheese product may have a viscosity between about 500,000 centipoises and about 1,500,000 centipoises at a temperature of about 74° F.

Where it is desired to add solid adjuvants such as fruits, vegetables or nuts to the yogurt cream cheese product, they are preferably added after the whipping process is completed.

EXAMPLE 1

A batch of 1,500 pounds of pre-pasteurized heavy cream having a butterfat content of 44% was pumped into a kettle equipped with heating and agitation means. The cream was heated with agitation to 85° F., whereupon 500 milligrams of pHage Control™ 604 cream cheese culture bacteria were added to the cream with agitation for 15 minutes. The cream was then maintained at 85° F. for 75 minutes. The butterfat content of the cream was then adjusted to 33% by weight by the addition with agitation of 195.8 pounds of nonfat dry milk and 180 pounds of water. After 15 minutes of agitation, 9.01 pounds of K6B493 stabilizer was added to the cream with agitation to thicken the mixture. The cream was then pasteurized by heating it with agitation to 165° F. and holding at that temperature for 15 minutes. The temperature of the resulting cream cheese precursor was adjusted to 130° F. Approximately 29% by weight of the protein content in this cream cheese precursor was derived from the cream; the balance being derived from the nonfat dry milk and stabilizer.

Meanwhile, yogurt was separately and simultaneously prepared. A batch of 312 pounds of condensed nonfat milk having a solids content of 33% by weight was provided. The solids content was adjusted to 20% by weight, by addition of 187 pounds of water. The condensed milk was then pasteurized by heating it with agitation to 165° F. and holding at that temperature for 15 minutes. The temperature of the condensed milk was then adjusted to 108° F., whereupon 250 milligrams of F-DVS YoFast®-10 yogurt culture bacteria were added to the condensed milk with agitation for 15 minutes. The condensed milk was then maintained at 108° F. for 6 hours. The resulting yogurt was then ready for combination with the cream cheese precursor. Next, 470 pounds of the prepared yogurt was mixed into 1,880 pounds of the cream cheese precursor with agitation. The mixture was cooled to a temperature of 125° F., and then homogenized by subjecting the mixture to a pressure of about 3,000 PSI at a temperature of 125° F. for about 5 seconds. The homogenized mixture was then acidified to a pH of about 4.5 by addition of 25 pounds of Stabilac® 12 Natural acid.

The resulting yogurt cream cheese product comprised about 25.9% by weight of butterfat; about 4.54% by weight of milk protein; about 0.0813% by weight of cholesterol; about 0.211% by weight of sodium; about 58.3% by weight of water; and about 41.7% by weight of solids. Concerning the protein content of this final product, approximately: 57% was derived from the nonfat dry milk together with the stabilizer; 23% was derived from the cream; and 20% was derived from the yogurt. The yogurt cream cheese product had a viscosity of about 1,336,000 centipoises at a temperature of about 74° F., and yielded substantially no syneresis after 15 hours at about 74° F. to about 75° F.

EXAMPLE 2

A batch of 1,335 pounds of pre-pasteurized heavy cream having a butterfat content of 44% is pumped into a kettle equipped with heating and agitation means. The cream is heated with agitation to 85° F., whereupon 500 milligrams of pHage Control™ 604 cream cheese culture bacteria are added to the cream with agitation for 15 minutes. The cream is then maintained at 85° F. for 75 minutes. The butterfat content of the cream is then adjusted to 23.5% by weight by the addition with agitation of 244 pounds of nonfat dry milk and 765 pounds of water. After 15 minutes of agitation, 11.25 pounds of K6B493 stabilizer is added to the cream with agitation to thicken the mixture. The cream is then pasteurized by heating it with agitation to 165° F. and holding at that temperature for 15 minutes. The temperature of the resulting cream cheese precursor is adjusted to 130° F. Approximately 54% by weight of the protein content in this cream cheese precursor is derived from the cream; the balance being derived from the nonfat dry milk and stabilizer.

Yogurt is separately and simultaneously prepared in the same manner as described in Example 1. Next, 500 pounds of the prepared yogurt is mixed into 2,000 pounds of the cream cheese precursor with agitation. The mixture is cooled to a temperature of 125° F., and then homogenized by subjecting the mixture to a pressure of about 3,000 PSI at a temperature of 125° F. for about 5 seconds. The homogenized mixture is then acidified to a pH of about 4.5 by addition of 25 pounds of Stabilac® 12 Natural acid.

The resulting yogurt cream cheese product comprises about 18.74% by weight of butterfat; about 8.85% by weight of milk protein; about 0.0613% by weight of cholesterol; about 0.331% by weight of sodium; about 49.77% by weight of water; and about 50.23% by weight of solids. Concerning the protein content of this final product, approximately: 40.2% is derived from the nonfat dry milk together with the stabilizer; 47.1% is derived from the cream; and 12.7% is derived from the yogurt. The yogurt cream cheese product has a viscosity of about 1,000,000 centipoises at a temperature of about 74° F., and yields less than about 1% syneresis by weight after 15 hours at about 74° F. to about 75° F.

While the present invention has been disclosed in a presently preferred context, it will be recognized that the present teachings may be adapted to a variety of contexts consistent with this disclosure and the claims that follow. For example, the process shown in the figures and discussed above can be adapted in the spirit of the many optional parameters described, to yield a variety of products, including, for example, yogurt cream cheese, yogurt neufchatel cheese, and yogurt low-fat cream cheese.

We claim:

1. A process for making a yogurt cream cheese product comprising steps of:
   providing a milkfat fluid having an initial butterfat content level;
   pasteurizing said milkfat fluid to yield a pasteurized milkfat fluid;
   providing a yogurt, and combining said yogurt with said pasteurized milkfat fluid to yield a combined precursor; and
   homogenizing and acidifying said combined precursor; yielding a yogurt cream cheese product.

2. The process of claim 1 in which said milkfat fluid includes cream.

3. The process of claim 1 in which said initial butterfat content level is between about 33% to about 50% by weight.

4. The process of claim 1 in which said initial butterfat content level is between about 17% to about 33% by weight.

5. The process of claim 1 in which said initial butterfat content level is between about 10% to about 17% by weight.

6. The process of claim 1 including the step of adjusting said initial butterfat content level.

7. The process of claim 1 including the steps of providing culture bacteria, and culturing said milkfat fluid with said culture bacteria.

8. The process of claim 1 including the steps of providing a stabilizer, and adding said stabilizer to said milkfat fluid.

9. The process of claim 1 in which said yogurt includes live culture bacteria.

10. The process of claim 1, including the step of adding live culture bacteria to said combined precursor.

11. The process of claim 1, in which the step of homogenizing said combined precursor is carried out at an elevated pressure.

12. The process of claim 1, in which said step of acidifying said combined precursor results in a pH between about 4.1 and about 5.0.

13. The process of claim 1, including the step of agitating said yogurt cream cheese product in the presence of an inert gas at an elevated pressure.

14. The process of claim 1 in which said pasteurized milkfat fluid includes retained whey from said milkfat fluid.

15. The process of claim 1 in which said pasteurized milkfat fluid is not homogenized.

16. The process of claim 1, in which said yogurt is made by steps including:
   providing milk;
   pasteurizing said milk to yield pasteurized milk;
   cooling said pasteurized milk to a bacteria culture temperature; and
   adding live culture bacteria to said pasteurized milk; yielding yogurt.

17. The process of claim 1, in which said yogurt constitutes between about 10% by weight and about 40% by weight of said yogurt cream cheese product.

18. The process of claim 6 in which said step of adjusting said initial butterfat content level yields a butterfat content level between about 10% to about 50% by weight.

19. The process of claim 7 including the step of pasteurizing said milkfat fluid before said culture bacteria substantially digest said milkfat fluid.

20. The process of claim 7 including the step of pasteurizing said milkfat fluid within about 60 minutes to about 90 minutes after adding said culture bacteria to said milkfat fluid.

21. The process of claim 10 including prior to combining said yogurt with said pasteurized milkfat fluid, the step of cooling said pasteurized milkfat fluid to a bacteria culture temperature.

22. The process of claim 10, including the step of culturing said bacteria in said combined precursor prior to homogenizing said combined precursor.

23. The process of claim 11 in which said pressure is between about 2,000 pounds per square inch and about 4,000 pounds per square inch.

24. The process of claim 13 in which the temperature of said yogurt cream cheese product is adjusted to between about 70° F. and about 90° F. prior to beginning the step of agitating.

25. The process of claim 18, in which following said step of adjusting, said milkfat fluid includes by weight about 34.5% to about 50% butterfat, about 3% to about 7% protein, and about 59% to about 42% water, with the balance constituted by other milk solids.

26. The process of claim 13 in which the temperature of said yogurt cream cheese product is adjusted to between about 60° F. and about 70° F. during the step of agitating.

27. The process of claim 25, in which at least about 40% of the milk protein is derived from said milkfat fluid and said yogurt.

28. The process of claim 27, in which at least about 50% of the milk protein is derived from said milkfat fluid and said yogurt.

29. The process of claim 25, in which the viscosity of the yogurt cream cheese is adjusted to within a range of between about 1,000,000 centipoises and about 3,000,000 centipoises at about 74 degrees F.

30. The process of claim 25, carried out in such a manner so that the yogurt cream cheese: comprises between about 8% by weight and about 35% by weight of total butterfat; comprises between about 10% by weight and about 40% by weight of yogurt; and has a viscosity within a range of between about 1,000,000 centipoises and about 3,000,000 centipoises at a temperature of about 74 degrees F.

31. The process of claim 25, carried out in such a manner so that the yogurt cream cheese: comprises between about 10% by weight and about 26% by weight of total butterfat; comprises between about 10% by weight and about 40% by weight of yogurt; and has a viscosity within a range of between about 1,000,000 centipoises and about 3,000,000 centipoises at a temperature of about 74 degrees F.

32. The process of claim 25, carried out in such a manner so that the yogurt cream cheese: comprises between about 23% by weight and about 26% by weight of total butterfat; comprises between about 10% by weight and about 40% by weight of yogurt; and has a viscosity within a range of between about 1,000,000 centipoises and about 3,000,000 centipoises at a temperature of about 74 degrees F.

33. The process of claim 25, carried out in such a manner so that the yogurt cream cheese product: comprises between about 25% by weight and about 26% by weight of total butterfat; comprises between about 10% by weight and about 40% by weight of yogurt; and has a viscosity within a range of between about 1,000,000 centipoises and about 3,000,000 centipoises at a temperature of about 74 degrees F.

34. The process of claim 30, carried out in such a manner so that the yogurt cream cheese product comprises between about 14% by weight end about 22% by weight of yogurt.

35. The process of claim 31, carried out in such a manner so that the yogurt cream cheese product comprises between about 14% by weight and about 22% by weight of yogurt.

36. The process of claim 32, carried out in such a manner so that the yogurt cream cheese product comprises between about 14% by weight and about 22% by weight of yogurt.

37. The process of claim 33, carried out in such a manner so that the yogurt cream cheese product comprises between about 14% by weight and about 22% by weight of yogurt.

38. The process of claim 13, carried out in such a manner so that the yogurt cream cheese product has a viscosity within a range of between about 500,000 centipoises and about 1,500,000 centipoises at a temperature of about 74 degrees F.

* * * * *